United States Patent
Hisano

(10) Patent No.: US 7,572,502 B2
(45) Date of Patent: Aug. 11, 2009

(54) ULTRATHIN FLEXIBLE SHEET AND METHOD FOR MANUFACTURING SAME

(75) Inventor: Hirokazu Hisano, Akoh (JP)

(73) Assignee: Gore Enterprise Holdings, Inc., Newark, DE (US)

( * ) Notice: Subject to any disclaimer, the term of this patent is extended or adjusted under 35 U.S.C. 154(b) by 0 days.

(21) Appl. No.: 11/290,871

(22) Filed: Nov. 29, 2005

(65) Prior Publication Data

US 2007/0122607 A1 May 31, 2007

(51) Int. Cl.
B32B 3/26 (2006.01)
B32B 3/00 (2006.01)
B32B 9/00 (2006.01)
B32B 27/00 (2006.01)

(52) U.S. Cl. .............. 428/304.4; 428/315.9; 428/318.4; 428/319.3

(58) Field of Classification Search .............. 428/304.4, 428/315.9, 318.4, 319.3
See application file for complete search history.

(56) References Cited

U.S. PATENT DOCUMENTS

| | | | | | |
|---|---|---|---|---|---|
| 2,768,902 | A | * | 10/1956 | Scholl | 156/254 |
| 4,437,271 | A | * | 3/1984 | McAvoy | 451/532 |
| 4,692,369 | A | | 9/1987 | Nomi | 428/198 |
| 2002/0031628 | A1 | | 3/2002 | Zumbruro et al. | 428/36.9 |
| 2003/0054155 | A1 | * | 3/2003 | Nomi et al. | 428/306.6 |

FOREIGN PATENT DOCUMENTS

| | | |
|---|---|---|
| JP | 61-40328 | 7/1984 |
| JP | 3-29575 B | 3/1987 |
| JP | 0398508 | 11/1990 |
| JP | 6-190852 A | 12/1992 |
| JP | 10-138276 A | 11/1996 |

OTHER PUBLICATIONS

Japanese Standards Association, JIS K 6251, 2004, pp. 1 through 20 (Translation), Date: Mar. 22, 2004.
Japanese Standards Association, JIS B 7609, pp. 1 through 21 (Translation), Date: Jul. 20, 2000.

* cited by examiner

*Primary Examiner*—Victor S Chang
(74) *Attorney, Agent, or Firm*—Richard W. Ellis

(57) ABSTRACT

The invention provides an ultrathin high-strength flexible sheet that has exceptional appearance, surface smoothness, and feel; and that presents no risk of rubber residues forming even in the case of degradation. An ultrathin flexible sheet is formed from an elastomer composite in which the pores of a porous film (e.g., a film made from stretched porous polytetrafluoroethylene) are filled with an elastomer, and the elastomer layer that covers the surface of the porous film is one micron or less in thickness. Examples of elastomers that may be employed include silicone-based elastomers (e.g., a methyl silicone-based elastomer and a phenyl silicone-based elastomer) and fluorine-based elastomers (e.g., a fluorosilicone elastomer, a fluoroelastomer, and a perfluoroelastomer). It is recommended that part of the surface of the porous film be left exposed. The ultrathin flexible sheet can be made 50 μm or less in thickness.

7 Claims, 5 Drawing Sheets

ULTRATHIN FLEXIBLE SHEET AND METHOD FOR MANUFACTURING SAME

BACKGROUND OF THE INVENTION

The present invention relates to an ultrathin flexible sheet and a method for manufacturing same. The ultrathin flexible sheet may be suitably used as a cushioning material, sealing material, insulating material, vibration-dampening material, or the like.

Conventional rubber sheets are manufactured by means of calendar extrusion or press-molding (e.g., JP Kokoku 3-29575). In JP Kokoku 3-29575 it has been proposed that kneaded rubber be rolled by a first pair of rolls into a rubber sheet of a prescribed thickness, the rubber sheet be transferred onto a release sheet by a second pair of rolls set to a gap size that is the total of the release sheet thickness and the prescribed rubber thickness, and the resulting article be withdrawn and vulcanized. In JP Kokai 6-190852 it has been proposed that kneaded rubber be calendared to a prescribed thickness, transferred onto a fabric liner, and subsequently withdrawn and vulcanized to manufacture an ultrathin rubber sheet. However, these ultrathin rubber sheets have inadequate strength since they consist solely of the rubber sheet.

Techniques have accordingly been proposed for producing rubber/reinforcing material composites. For example, it is proposed in JP Kokoku 10-138276 that an non-vulcanized rubber composition be applied onto a separator and dried, a reinforcing fabric (non-woven cloth) be laminated on the resulting non-vulcanized rubber composition, and the resulting laminated material be vulcanized under a pressure load to manufacture an ultrathin rubber sheet wherein the ultrathin reinforcing fabric (non-woven cloth) has penetrated, and become integrated with, the rubber layer. An insulating resin film formed by impregnating a stretched porous film material with a silicone rubber solution and subjecting the resulting article to crosslinking polymerization is disclosed in JP Kokai 61-40328. However, these reinforced rubbery articles (e.g., the ultrathin rubber sheet of JP Kokoku 10-138276 and the insulating resin film of JP Kokai 61-40328) have cross-sectional structures of the kind shown in FIG. 1. In other words, not only are the pores 12 of the reinforcing member (e.g., the reinforcing fabric (non-woven cloth) of JP Kokoku 10-138276 and the expanded porous film material of JP Kokai 61-40328) 11 filled with the rubber 21, but the surface 13 of the reinforcing member 11 is covered by a thick rubber layer 22. In JP Kokai 61-40328 in particular, excess silicone rubber is scraped off the surface with a rubber blade after the silicone rubber solution impregnation; nevertheless, a relatively thick layer of silicone rubber will inevitably remain on the surface. As a result, the appearance, surface smoothness, feel, and other attributes are not only degraded, but the risk arises that the rubber portion 22 on the surface will peel off and rubber residues will also remain if the rubber 21, 22 degrades.

SUMMARY OF THE INVENTION

The issues described hereinabove are the focus of the present invention, and it is an object thereof to provide an ultrathin, high-strength flexible sheet having exceptional appearance, surface smoothness, feel, and other attributes; and that is devoid of any risk that rubber residues will form if the rubber degrades.

A further object of the present invention is to provide a method for efficiently and conveniently manufacturing the ultrathin flexible sheet.

DETAILED DESCRIPTION OF THE INVENTION

Figure 1:
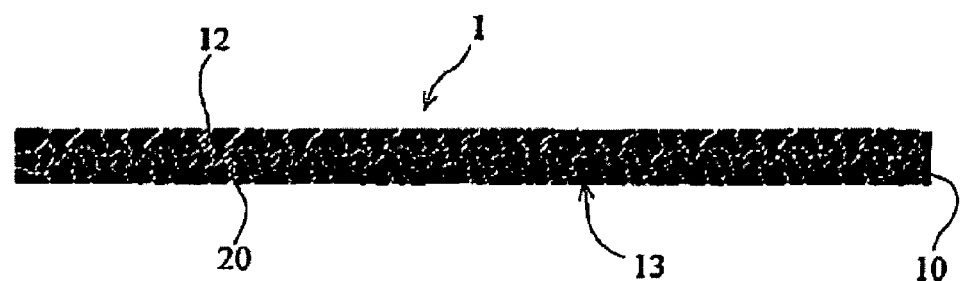
FIG. 1 is a cross-sectional diagram schematically illustrating an ultrathin flexible sheet of the prior art and the comparative examples.

In resolving these issues, the present inventors investigated scraping off the rubber on the surface of the reinforcing rubbery article in JP Kokai 61-40328. Nevertheless, scraping off the rubber is extremely inefficient from a productivity standpoint, and even after the scraping has been performed, the surface rubber layer cannot be made adequately thin. As a result of further assiduous studies, the present inventors perfected the present invention by discovering that if porous films are laminated and joined together, the resulting bonded article is impregnated with a liquid elastomer that is then allowed to solidify, and the laminated porous films are subsequently pulled off one at a time, then the elastomer will substantially remain only in the interior of the peeled porous films, and the surface elastomer layer can be made ultrathin.

In other words, the main point of the ultrathin flexible sheet of the present invention is that same is a porous film-elastomer composite whose pores are filled with an elastomer, and the thickness of an elastomer layer that covers a surface of the porous film is one micron or less. It is desirable for some of the surfaces of the porous films to be left exposed. According to the present invention, the ultrathin flexible sheet can be made considerably thin; e.g., 50 μm or less in thickness. The ultrathin flexible sheet of the present invention also has exceptional surface smoothness and feel; e.g., the sheet will be able to pass the smoothness test hereinbelow described.

The porous films are preferably composed of stretched porous polytetrafluoroethylene, and examples of preferred elastomers include silicone-based elastomers (e.g., methyl silicone-based elastomers and phenyl silicone-based elastomers) and fluorine-based elastomers (e.g., fluorosilicone elastomers, fluoroelastomers, and perfluoroelastomers).

The ultrathin flexible sheet can be manufactured by laying three or more layers of porous films atop one another, joining (and especially thermocompression-bonding) them together without any gaps being formed between the layers nor any wrinkles formed in the films, impregnating the joined article with a liquid elastomer that is subsequently caused to solidify, and then pulling apart the tightly bonded and laminated porous films.

Also included in the present invention is an intermediate formed according to the aforedescribed manufacturing process; i.e., a laminated article formed from three or more layers of porous films that have been joined together without any gaps being formed between the layers, nor any wrinkles in the films, with the pores in the porous films being filled with an elastomer.

The ultrathin flexible sheet of the present invention has exceptional strength due to the porous film being used as a base substrate, and exceptional appearance, surface smoothness, and feel due to the absence of a thick elastomer layer on its surface. Furthermore, no risk is presented in relation to rubber residues forming if the rubber degrades, and an extremely high degree of thinness will be able to be achieved if merely a thin porous film is used.

The ultrathin flexible sheet can be manufactured in a very straightforward manner by laminating and joining the porous films together, impregnating the resulting bonded article with a liquid elastomer that is then allowed to solidify, and then pulling apart the porous films.

The present invention is described in detail below with reference to the drawings; however, the present invention shall not be construed to be limited to the illustrated embodiments, and may indeed be implemented through suitable modification within the scope applicable to the main points described hereinbelow or hereinabove, with all such modifications being included within the technical purview of the invention.

Figure 2:
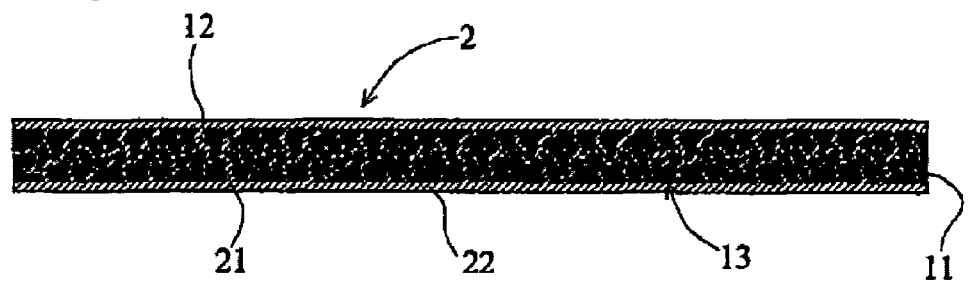
FIG. 2 is a cross-sectional diagram schematically illustrating the ultrathin flexible sheet of the present invention.

FIG. 2 is a cross-sectional diagram schematically illustrating an embodiment of the ultrathin flexible sheet 1 of the present invention. As is shown in FIG. 2, the ultrathin flexible sheet 1 (elastomer composite) of the present invention has a porous film 10 as a base substrate, the pores within the porous film 10 are filled with an elastomer 20, and the sheet 1 is configured to exhibit flexibility as a whole. The surface 13 of the ultrathin flexible sheet 1 is not substantially covered by the elastomer. In other words, the thickness of the elastomer layer that covers the surface 13 (the average thickness) is, e.g., approximately 1 μm or less, preferably approximately 0.7 μm or less, and ideally approximately 0.5 μm or less. In the present invention, the surface 13 of the ultrathin flexible sheet 1 is not covered by a thick elastomer, for which reason an exceptional appearance, surface smoothness, and feel are obtained, with no risk being presented that rubber residues will form if the rubber degrades.

It is desirable for some of the surface 13 of the porous film 10 to be left exposed. If the porous film 10 is exposed, then the appearance, surface smoothness, and feel can be further improved; and the formation of rubber residues will be more effectively preventable, though the surface elastomer layer will have become too thin for measurements to be performed without complications.

It is possible to confirm whether or not the porous film 10 is exposed by observing the surface 13 of the ultrathin flexible sheet 1 with a scanning electron microscope (acceleration voltage: 5 kV; magnification: 5,000×). For example, if the stretched porous polytetrafluoro-ethylene (PTFE) film described hereinafter is used as the porous film 10, then the stretched porous PTFE fibril and node configurations will be able to be clearly observed, and the exposure of the porous film 10 can be determined in those regions where these fibril and node configurations have a whitish appearance.

It is desirable for the surface 13 of the ultrathin flexible sheet 1 to be substantially devoid of wrinkling. A smaller incidence of wrinkling corresponds to a better appearance, surface smoothness, and feel. The surface smoothness and feel of the ultrathin flexible sheet 1 can be assessed according to the smoothness test described hereinbelow. It is especially desirable for the ultrathin flexible sheet 1 to be able to pass the smoothness test. Sheets that pass the test have exceptional surface smoothness, are devoid of tackiness, and are dry to the touch.

Surface Smoothness Test:

An ultrathin flexible sheet is spread out onto a smooth plate so that no wrinkles are formed, a weight having a mass of ten grams as specified in JIS B 7609 is laid thereupon, the smooth plate is tilted away from a horizontal state (angle of inclination: 0°), the angle of inclination at which the weight begins to slide is measured, and the sheet will be considered to have passed the test if the angle of inclination at which the weight begins to slide is always 50° or less (preferably 40° or less and ideally 35° or less), irrespective of where the weight has been positioned.

The rupture strength of the ultrathin flexible sheet 1 is, e.g., 10 MPa or higher, preferably 30 MPa or higher, and ideally 50 MPa or higher. The rupture strength can be measured by pulling a JIS K 6251-compliant test piece punched out in the form of a no. 3 dumbbell at a rate of 200 mm/min.

The tear strength of the ultrathin flexible sheet 1 is, e.g., 5 N or higher, preferably 10 N or higher, and ideally 20 N or higher. The tear strength can be measured by forming a 50-mm-long slit from the center of a short side of a 100 mm (length)×50 mm (width) rectangular test piece and heading towards its center, and then pulling both sides of the slit at a rate of 200 mm/min so that they head in opposite directions.

According to the present invention, the ultrathin flexible sheet 10 [sic] can be made ultrathin; e.g., thicknesses of 100 μm or less, preferably 70 μm or less, and ideally 50 μm or less (and especially 40 μm or less) can even be achieved. The sheet can also reach thicknesses on the order of several microns (e.g., approximately one micron). If the sheet is made too thin, the degree of impact or vibration absorption required in certain applications may occasionally be inadequate. The lower limit of the thickness may be, e.g., 5 μm or higher, 10 μm or higher, or approximately 20 μm or higher.

Examples of the porous film 10 that forms the ultrathin flexible sheet 1 include resin films containing continuous voids caused by foaming, resin films manufactured by eluting the island portions of a resin having continuous island regions in a sea-island structure, and other resin films. Stretching may be employed to form the porous structure, depending on the characteristics of the resin.

There are no particular limitations as to the resin used to form the porous films 10, provided that the flexibility of the ultrathin flexible sheet 1 is not substantially compromised. Thermoplastic resins are particularly recommended since the sheet can be prevented from becoming rigid by increasing the foam or draw ratio and the flexibility of the porous films 10 can be readily maintained. Nevertheless, as shall be described hereunder, the porous films 10 must be pulled apart from one another once they have been laminated and joined together, the resulting bonded article has been impregnated with the liquid elastomer, and the elastomer has been allowed to solidify. In order for the porous films 10 to be able to be pulled apart, the porous films 10 must not melt and bond fast during the processes of impregnating into the porous films 10 and solidifying the elastomer; and it is recommended that the melting point of the the resin that forms the porous film 10 be, e.g., 100° C. or higher, preferably 200° C. or higher, and ideally 300° C. or higher. Examples of such thermoplastic resins include polyethylene, polypropylene, and other polyolefins; polyvinyl chloride, polyvinylidene chloride, and other halogen (especially chlorine)-containing resins; polyamide, polyimide, and other resins containing an amino bond; polyphenylene ether, polyphenylene sulfide, and other polyphenylene resins; polyesters; polystyrenes; polycarbonates; and fluororesins. The latter are especially desirable.

Examples of fluororesins include homo- or co-polymers of fluorine-containing vinyl monomers. Suitable examples include homopolymers (polyvinyl fluoride and polyvinylidene fluoride) or copolymers of fluorine-containing vinyl monomers in which some of the hydrogen atoms have been replaced by fluorine atoms, and homo- or co-polymers of fluorine-containing vinyl monomers (fluorine-containing perhaloalkylenes) wherein at least some of the hydrogen atoms have been replaced by fluorine atoms and the other hydrogen atoms have been replaced by fluorine atoms or other halogens (e.g., chlorine). Examples of homo- or copolymers of perhalo-alkylenes include homopolymers of fluorine-containing perhaloalkylenes (e.g., polytetrafluoro-ethylene (PTFE) and polychlorotetrafluoroethylene), copolymers of chlorine-containing perhalo-monomers (preferably copolymers of PTFE and another fluorine-containing perhalomonomer; e.g., tetrafluoroethylene-hexafluoropropylene copolymer (FEP) and tetrafluoroethylene-perfluoroalkyl vinyl ether copolymer (PFA)), and copolymers of fluorine-containing perhalo-alkylenes and alkylenes (e.g., ethylene-tetrafluoroethylene copolymer (ETFE)). Examples of preferred fluororesins include PTFE, FEP, and PFA, with PTFE being especially preferred.

Fluorine-resin films can usually be obtained by first melting the fluororesin, and then extruding the resin through a die or the like to form the film. However, PTFE cannot be melted/formed into films. Accordingly, if PTFE is selected as the fluororesin, then the porous PTFE film to be used will be formed by stretching a molded article composed of a PTFE fine powder formed into a paste (stretched porous PTFE film). The porous film 10 (ultrathin flexible sheet 1) can readily be made thin by being stretched. Expanded porous PTFE films are particularly exceptional in terms of their flexibility and can be manufactured with a high porosity, which makes them highly suitable for use as a base member for the ultrathin flexible sheet 1.

Stretching may be performed uniaxially or biaxially. If a uniaxially stretched film is used, the elongation will be low in the stretching direction and high in the non-stretching direction, which will result in an ultrathin flexible, anisotropic sheet. If a biaxially stretched film is employed, then an ultrathin flexible sheet having exceptional shape stability in the planar direction will be obtained. Uniaxially stretched porous PTFE films are characterized at the microscopic level by the presence of narrow, island-like nodes that are substantially perpendicular to the stretching direction (folded-over crystals), and by the fact that fibrils linking the nodes together in a spiderweb-like configuration (straight-chain molecular bundles formed when the folded crystals are unraveled and pulled out as a result of the stretching) are oriented in the stretching direction. Biaxially stretched porous PTFE films are characterized at the microscopic level by the fact that the fibrils extend in a radial fashion, the nodes to which the fibrils are linked are interspersed as islands, and their fiber structure resembles a spiderweb in which numerous spaces are defined by the fibrils and nodes.

The porosity of porous PTFE films can be suitably adjusted in accordance with the draw ratio and the like; e.g., 30% or higher (preferably 50% and higher and ideally 70% and higher) and approximately 95% or lower (preferably 93% or lower and ideally 90% or lower). A higher porosity corresponds to more thorough elastomer penetration. Since a higher porosity corresponds to a greater amount of elastomer embeddable in the pores, the resilience of the ultrathin flexible sheet 1 can be increased. Conversely, at lower levels of porosity, the strength of the ultrathin flexible sheet 1 can be increased.

The porosity can be calculated from the formula below by using the bulk density D, which is determined by measuring the weight W of the porous PTFE and the apparent volume V that includes the porous region (D=W/V, expressed in terms of $g/cm^3$), and also using the density $D_{std}$ of a film devoid of pores (2.2 $g/cm^3$)

Porosity (%)=$(1-(D/D_{std}))\times 100$

The mean pore diameter of the porous PTFE can also be suitably adjusted according to the draw ratio or the like; e.g., approximately 0.05 to 5 μm and preferably approximately 0.5 to 1 μm. A higher mean pore diameter corresponds to more thorough elastomer penetration. The mean pore diameter can be measured with a Coulter Porometer from Coulter Electronics.

As will be readily apparent, the thickness of the porous film 10 should be substantially the same as that of the ultrathin flexible sheet 1 (i.e., equal to or less than that of the ultrathin flexible sheet 1, but is no more than one micron less than the thickness of the ultrathin flexible sheet 1).

There are no particular limitations as to the elastomer 20, provided that it will penetrate the pores 12 within the porous films 10 and be able to impart flexibility thereto. Suitable examples include natural-rubber-based elastomers, synthetic-rubber-based elastomers (isoprene-, chloroprene-, butadiene-, styrene-butadiene copolymer-, nitrile-, acrylic, silicone-, fluorine-, sulfide-, urethane-, and phosphazene-based elastomers), and thermoplastic elastomers. The elastomer 20 is preferably a silicone- or fluorine-based elastomer.

Examples of silicone-based elastomers include crosslinked organopolysiloxanes having a methyl-silicon backbone (e.g., methyl silicone elastomers) and crosslinked organopolysiloxanes having an organic hydrocarbon-silicon backbone (e.g., phenyl silicone elastomers).

Examples of fluorine-based elastomers include crosslinked polyfluoromethylene in which hydrogen atoms may be left over (fluoroelastomers), crosslinked polyfluoromethylene in which all of the hydrogen atoms have been replaced by fluorine atoms (perfluoroelastomers), and crosslinked organopolysiloxanes having a fluoroalkyl group-silicon backbone (fluorosilicone elastomers; e.g., elastomers having a dimethylsiloxane-methyl trifluoropropyl siloxane bond structure and elastomers in which the fluoropolyether backbone has been crosslinked with silicone (e.g., "SIFEL", manufactured by Shin-etsu Chemical Co., Ltd.)).

Figure 3A:
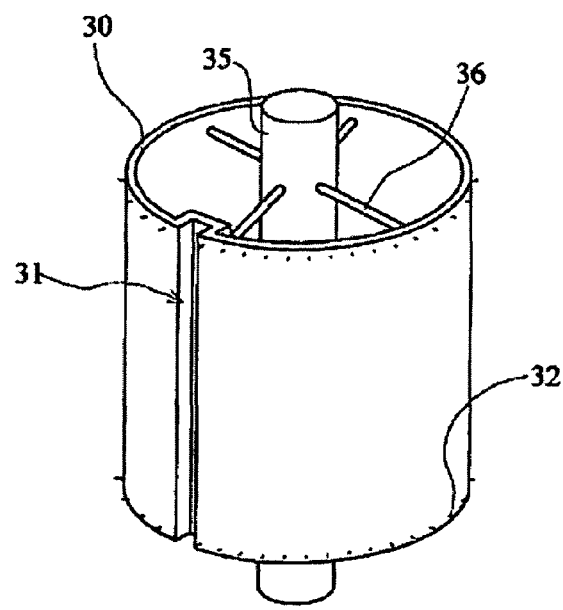
FIG. 3(a) is a perspective schematic drawing of a mandrel used in an example of a method for manufacturing the ultrathin flexible sheet of the present invention.
Figure 3B:
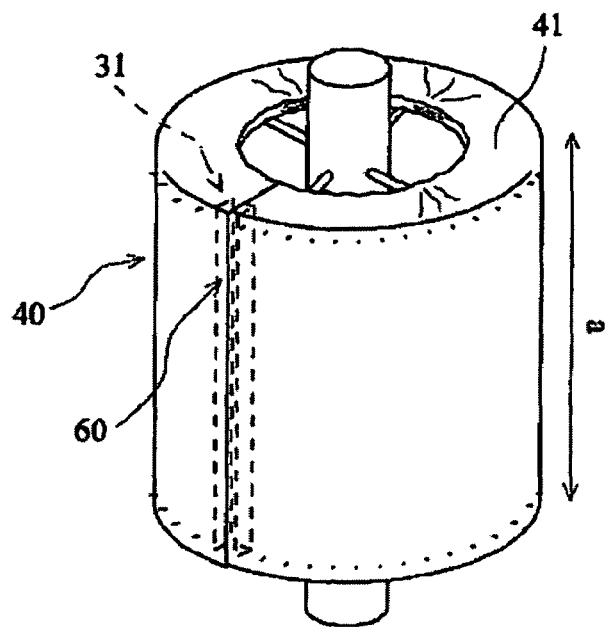
FIG. 3(b) is a first perspective schematic drawing used to describe an example of a method for manufacturing the ultrathin flexible sheet of the present invention.
Figure 4:
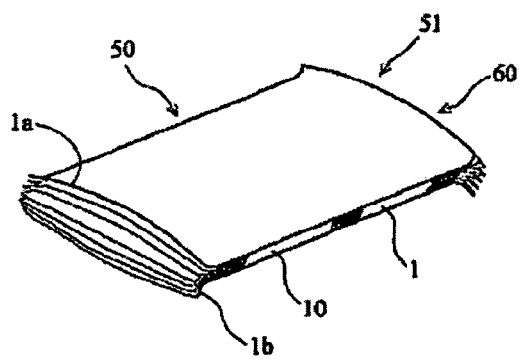
FIG. 4 is a second perspective schematic drawing used to describe an example of a method for manufacturing the ultrathin flexible sheet of the present invention.

A method for manufacturing the ultrathin flexible sheet 1 shall be described hereunder. FIGS. 3(a), 3(b) and 4 are perspective schematic diagrams used for describing an example of the manufacturing method. In this example, as shown in FIG. 3(a), a hollow cylindrical mandrel 30 whose exterior peripheral surface is provided with a plurality of pin tenters 32 is employed, a shaft 35 connected to rotating means (not shown) is inserted through the center of the hollow region of the mandrel 30 so as to lie parallel thereto, and the shaft 35 and mandrel 30 are joined by means of radially extending spokes 36. The rotating means (together with the shaft 35) is used to cause the mandrel 30 to rotate, which enables the porous film 10 to be laminated by being wound on the exterior peripheral surface of the mandrel 30 (FIG. 3(*b*)). In the example shown in FIG. 3(*b*), a porous film that is wider than the exterior peripheral width a of the mandrel 30 is laminated by being wound under tensioning while being fixed in place by the pin tenters 32. The article 40 formed from the wound and laminated porous films 10 is heated at an appropriate temperature, and the layers of the porous films 10 are bonded (heated and bonded; e.g., thermocompression-bonded) to each other, after which the wound laminated article 40 is slit open at an appropriate location (along a concavity 31 formed on the side wall of the mandrel 30, as shown in the diagram) to yield a substantially flat laminated article 50 (FIG. 4). In the illustrated example, the wound laminated article 40 is slit open along the concavity 31, after which the ends of the laminated article 40 are discarded after being cut off from the perforated portion (from the exterior peripheral surface of the mandrel 30 to the extraneous portion 41). Impregnation is then performed using a liquid elastomer (a raw material elastomer (a yet-uncured curable elastomer, a thermoplastic elastomer, or the like) dissolved in a suitable solvent, a heated and melted thermoplastic elastomer, or the like), the solvent is evaporated off, the un-cured elastomer is cured, the molten thermoplastic elastomer is cooled, and other procedures are used to form the liquid elastomer into a solid, by which means the pores 12 within the porous film 10 will become filled with the elastomer 20. The ultrathin flexible sheet 1 of the present invention is then manufactured by pulling off the porous films 10 from the laminated article 50 one layer at a time. The uppermost and lowermost sheets 1*a*, 1*b* of the laminated article 50 are discarded because their surfaces will be covered with a thick layer of elastomer, and only the sheets 1 that are obtained from the middle portions are taken as the ultrathin flexible sheet 1 of the present invention. According to this manufacturing method, it is possible to obtain a flexible sheet 1 whose surface is not substantially covered by the elastomer and in which there is no need to scrape off the elastomer, and exceptional levels of production efficiency and convenience are achieved.

The rotating means and shaft 35 are used for convenience when the porous film 10 is being wound, but the porous film 10 may also be wound without the rotating means or shaft 35 being used (e.g., the procedure may be performed manually).

The layers of the wound laminated film 10 do not necessarily need to be bonded together; they may be merely joined together so that the elastomer can be prevented from penetrating into the laminated film 10 (i.e., can be prevented from forming gaps in the laminated film 10) and wrinkles can be prevented from forming in the laminated film 10. For example, even if joining is performed, penetration of the elastomer between the layers and wrinkling can be prevented as long as the liquid elastomer impregnation is performed while pressure is applied to the laminated article 50 in the lamination direction and tension is applied in the planar direction. Nevertheless, the laminated film 10 is preferably bonded (thermally bonded). Thermal bonding will ensure that interlaminar elastomer penetration can be readily prevented, and wrinkles can be removed by thermal contraction. Thermocompression bonding will ensure that the films 10 can be made even thinner, and facilitate making the ultrathin flexible sheet 1 thinner. Bonding (thermally bonding) the porous films implies that the bond will be sufficient to prevent the films slipping or peeling away under the light loads unavoidably produced during the operations performed in the later steps, but not that the bond will be so strong as to render it impossible for the films to be pulled apart once they have been filled with the elastomer.

There are no particular limitations as to the method by which the film 10 is tensioned, but the only example in which the film 10 is wound under tension while being fixed in place with the pin tenters 32 is the one illustrated. As an alternative example, the film 10 can be wound and laminated, and subsequently pulled, with both ends in the winding width direction being held in chucks.

It is recommended that the thickness of the laminated articles 40, 50 be, e.g., 0.1 mm or greater (and preferably 0.5 mm or greater) and approximately 5 mm or less (and preferably 3 mm or less). If the laminated articles 40 and 50 are too thin, their ability to be handled will deteriorate, while if the articles are too thick, they will require longer periods of time to be impregnated with the liquid elastomer.

Since the uppermost and lowermost films 1*a*, 1*b* of the laminated articles 40, 50 will be discarded, three or more laminated layers (windings) need to be present; e.g., ten or more, and preferably twenty or more. A greater number of laminated layers (windings) corresponds to higher production efficiency.

It is recommended that the films 10 be kept slightly apart in the end regions 51 along the planar direction of the flat laminated article 50, as shown in FIG. 4. If the films 10 are filled with the elastomer 20 after having been kept apart on the end regions 51, then even when the flat laminated article 51 [sic] is itself formed into an integrated whole with the elastomer 20, the separated end regions 51 will not, which will facilitate the subsequent pulling apart of the films 10. In the example shown in FIG. 4, the films 10 have been kept apart along the edges of both ends 51 of the flat laminated article 50; however, there are no particular limitations as to the locations in which the films are kept apart as long as they lie on the exterior periphery of the laminated article 50. The location should be suitably determined by taking into account subsequent handleability, product yield, and other factors. For example, the films may be kept apart along the edge of one of the ends, or kept apart in certain regions not along the edge (such as the corner regions).

In order to facilitate keeping the films apart, separator layers (spacers) may be inserted into designated separating locations 51 during the lamination, or the compressive load and/or thermal load can be reduced in the designated separating locations 51 during thermocompression bonding. In the illustrated example, the fact that the concavity 31 is formed in the mandrel reduces the compressive load in the location 60 of the wound laminated article 40 that opposes the concavity 31, and the layers in the end regions 51 of the flat laminated article 50 will readily stay apart once the wound laminated article 40 is slit open along the concavity 31. It is not essential for the layers in the end regions 51 to be kept apart (or for the concavity 31 to be formed in the mandrel).

It is recommended that liquid elastomer impregnation be performed after the wound laminated article 40 has been opened, but impregnating the wound laminated article 40 with the liquid elastomer is an indispensable action. If the wound laminated article 40 is impregnated with the liquid elastomer, then the films 10 may be pulled apart after the wound laminated article 40 has been slit open, as with the illustrated example; alternatively, the film 10 can be pulled apart without being slit open, by unwinding the wound article.

It is not essential for a mandrel 30 to be used, or for a wound laminated article 40 to be formed; the flat laminated article 50 can be formed directly by laminating the porous film 10 in a planar manner. An example of a method that may be suitably adopted include using a plurality of films 10 that have been cut to predetermined dimensions, and laminating them under tensioning on a flat frame (or stand) on whose periphery pin tenters have been provided.

Once a wound laminated article 40 and/or a flat laminated article 50 have been formed, as has been described in the foregoing, the ultrathin flexible sheet 1 can be produced either in a batched or continuous format. For example, long strands of the ultrathin flexible sheet 1 may be produced in a continuous manner by laying a plurality of stretched films fed from conveyor rolls atop one another, using hot calender rolls to perform thermocompression bonding on the resulting article, dipping same in a tank filled with liquid elastomer, and causing the liquid elastomer to solidify.

Articles consisting of porous films 10 that have yet to be pulled apart (laminated porous films that have been filled with elastomer) may be stocked as intermediates for the manufacturing process described above.

The present invention is described in further detail below with reference to embodiments; however, the present invention shall not be construed to be limited to the illustrated embodiments, and may indeed be implemented through suitable modification within the scope applicable to the essence described hereinbelow or hereinabove, with all such modifications being included within the technical purview of the invention.

The stretched porous PTFE film described hereunder was used in the following embodiments and Comparative Examples.

Stretched Porous PTFE Film

A resin paste was obtained by mixing 22 mass parts of solvent naphtha with 100 mass parts of a PTFE powder manufactured by Asahi Glass Co., Ltd. (fine powder; trade name: CD123), the resin paste was fashioned into the form of a film, the film-like article that had been molded from the paste was heated at a temperature that was equal to or higher than the boiling point of the solvent naphtha (200° C. in the present example) to evaporate off the solvent naphtha, and the resulting article was biaxially stretched 200% in the pulling direction and 1000% in the direction perpendicular to the pulling direction at a temperature at or below the PTFE melting point (300° in the present example), thus yielding a 40-μm-thick stretched porous PTFE film having a porosity of 80%. The stretching was performed at a rate whereby the films lengthened by 150% every second.

EXAMPLE 1

A stretched porous PTFE film with a thickness of about 40 μm and a width of 700 mm was wound 40 times around a hollow cylindrical mandrel (made of stainless steel) that was 400 mm in diameter, 500 mm in length, and 3 mm in thickness (FIG. 3). Pin tenters were provided to the mandrel at 10 mm intervals along both ends of the exterior peripheral surface in the width direction (and, more precisely, 5 mm from the ends), and the stretched porous PTFE films were fixed in place by means of these pin tenters. The resulting wound laminated article 40 was placed in an oven and baked for 60 min at 365° C. The wound laminated article 40 was cooled to room temperature, and slit open in approximately the center of the concavity 31 (width: 10 mm; depth 5 mm) formed on the mandrel 30. The extraneous part 41 produced during winding was then cut off along the pinhole marks and removed (including the perforated regions) to yield a 1.0- mm-thick laminated article 50 whose planar shape was a rectangle 1256 mm in length and 480 mm in width. The baking reduced the thickness of the films 10 to 25 μm.

Separately, the main agent of a two-liquid reaction curing-type silicone elastomer ("KE1031"; trade name, Shin-Etsu Chemical Co., Ltd.) was mixed with a curing agent in a 1:1 mass ratio, and the resulting mixture was poured into a tray to a depth slightly in excess of one millimeter. The laminated article 50 was completely immersed in the tray, and left to stand for approximately one hour at room temperature. In order that the end regions 51 of the laminated article 50 would not be impregnated by the silicone elastomer during this time, the article was immersed in the tray with these regions bent at 90° angles. Once the laminated article 50 was confirmed to have been totally impregnated (i.e., once the laminated article 50 was confirmed to have assumed a semi-transparent state), it was removed and left to stand for 180 min in an oven heated to 80° C., and the impregnated elastomer was allowed to cure.

After the curing process, the films 10 were peeled off one at a time from the end regions 51 of the laminated article 50, and the peripheries (all four edges) of each film 10 were trimmed, thereby yielding 38 ultrathin flexible sheets 1 that were 25 μm thick whose planar shape was a rectangle 1200 mm in length and 450 mm in width. The resulting ultrathin flexible sheets 1 were entirely devoid of wrinkles, and their surface was completely free of any excess elastomer; it was therefore possible to obtain a large quantity of non-tacky sheets of satisfactory appearance, surface smoothness, and feel in a single operation.

Figure 5:
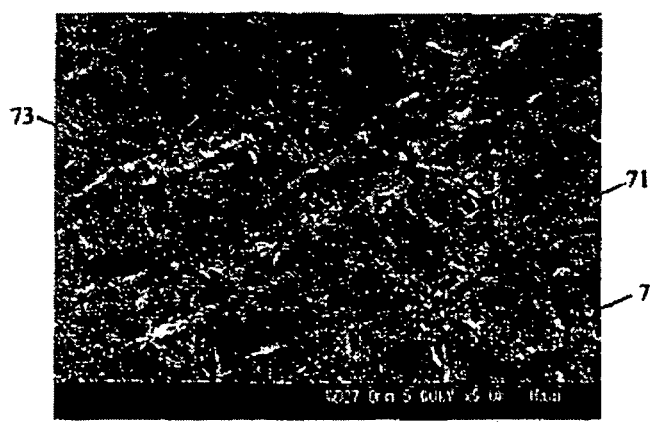
FIG. 5 is an electron photomicrograph of a top view of the ultrathin flexible sheet of Example 1.
Figure 6:
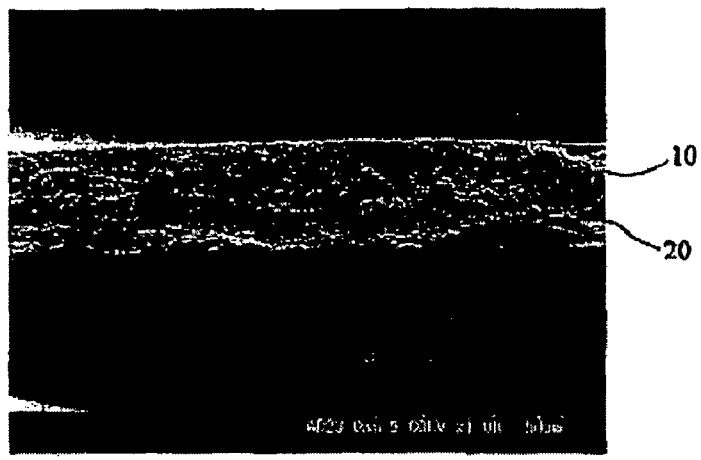
FIG. 6 is an electron photomicrograph of a cross-sectional view of the ultrathin flexible sheet of Example 1.

FIGS. 5 and 6 show photographs of the ultrathin flexible sheet 1 obtained in Example 1 as captured with a scanning electronic microscope (S-3000H) manufactured by Hitachi Ltd. FIG. 5 is an electron photomicrograph showing a top view of the ultrathin flexible sheet 1 (acceleration voltage: 5 kV, magnification 5000×), and FIG. 6 is an electron photomicrograph showing a cross-sectional view of same (acceleration voltage: 5 kV, magnification 1000×). As is evident from FIG. 5, the configuration of the fibrils 71 and nodes 72 of the stretched porous PTFE can be clearly confirmed from the top view photograph, with a portion 73 thereof being exposed, as is apparent from the fact that they have a whitish appearance. It is clear also from the cross-sectional photograph shown in FIG. 6 that the surface elastomer layer is ultrathin (and is substantially not even present).

In order to mathematically evaluate surface smoothness and feel (tackiness), the ultrathin flexible sheet 1 obtained in Example 1 was subjected to the aforedescribed smoothness test. The locations in which the weight was placed were selected arbitrarily but evenly so as to eliminate any bias. The results are displayed in Table 1.

TABLE 1

| | No. of location where weight was placed | | | | | | | | | | |
|---|---|---|---|---|---|---|---|---|---|---|---|
| | 1 | 2 | 3 | 4 | 5 | 6 | 7 | 8 | 9 | 10 | Avg. |
| Angle at which weigh started to slide | 26° | 28° | 26° | 28° | 20° | 22° | 20° | 30° | 20° | 22° | 24° |

As is evident from Table 1, the ultrathin flexible sheet 1 of Example 1 passed the smoothness test.

COMPARATIVE EXAMPLE 1

A stretched porous PTFE film was cut to dimensions of 300 mm by 300 mm, and spread out on a flat plate so that no wrinkles were formed. A suitable amount of the same silicone elastomer used in Example 1 was applied on the film and allowed to impregnate it. The excess elastomer present on the film was scraped off thrice with a spatula made of silicone rubber. Excess silicone elastomer that had seeped through to the reverse side of the film had to be scraped off that side in the same manner as with the obverse side. The tasks involved in flipping over the impregnated article and spreading it again on a different flat plate were extremely difficult. The elastomer-impregnated film was cured in an oven heated to a temperature of 80° C., after which the periphery (all four edges) of the film were trimmed to yield an ultrathin flexible sheet 2 that was 40 μm in thickness and measured 250 mm by 250 mm (FIG. 1). There were locations on the surface of the resulting ultrathin flexible sheet 2 in which macroscopic observation suggested that no excess elastomer remained, but there were also locations where the presence of excess elastomer could be confirmed even under macroscopic observation. Macroscopic observation revealed the residual excess elastomer to be linearly aligned in the direction it had been scraped by the spatula (a brush-like pattern). The surface of the sheet also exhibited a tacky feel.

Figure 7:
FIG. 7 is an electron photomicrograph (1st of 2) of a top view of the ultrathin flexible sheet of Comparative Example 1.
Figure 8:
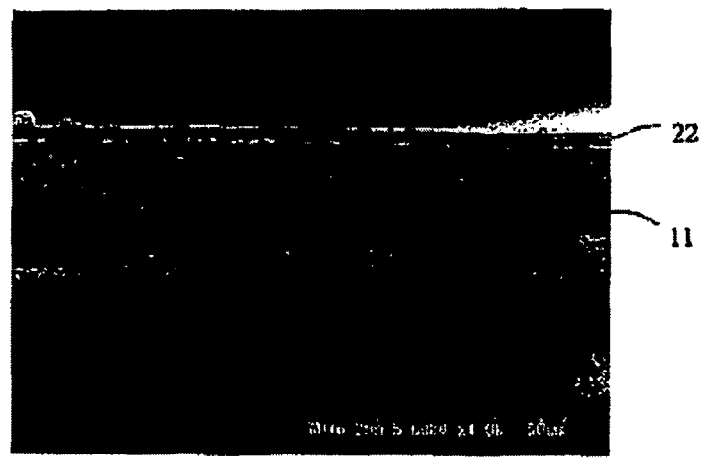
FIG. 8 is an electron photomicrograph (1st of 2) of a cross-sectional view of the ultrathin flexible sheet of Comparative Example 1.
Figure 9:
FIG. 9 is an electron photomicrograph (2nd of 2) of a top view of the ultrathin flexible sheet of Comparative Example 1.
Figure 10:
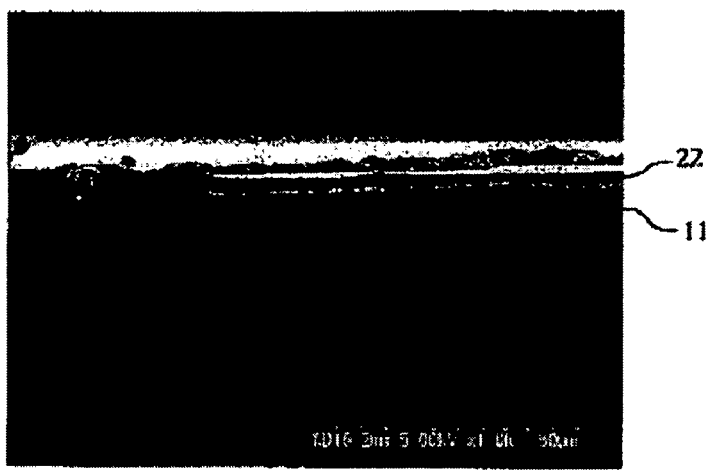
FIG. 10 is an electron photomicrograph (2nd of 2) of a cross-sectional view of the ultrathin flexible sheet of Comparative Example 1.

Electron photomicrographs of the ultrathin flexible sheet 1 obtained in Comparative Example 1 were captured in the same manner employed for that of Example 1. FIGS. 7 and 8 are, respectively, a top view photograph and a cross-sectional photograph of locations in which macroscopic observation suggested that no excess elastomer remained, and FIGS. 9 and 10 are, respectively, a top view photograph and a cross-sectional photograph of locations in which excess elastomer was confirmed to have remained even under macroscopic observation. As is evident from FIGS. 9 and 10, no fibrils or nodes of the stretched porous PTFE were observed whatsoever in the locations where even macroscopic observation confirmed the elastomer to have remained (FIG. 9), and a very thick elastomer layer 22 was deemed to have remained on the surface (FIG. 10). As is evident from FIGS. 7 and 8, virtually no fibrils or nodes of the stretched porous PTFE were observed according to the electron photomicrograph, even in the locations where macroscopic observation suggested that no elastomer remained (FIG. 7), and yet a very thick elastomer layer 22 remained on the surface (FIG. 8).

In order to mathematically evaluate surface smoothness and feel (tackiness), the sheet 2 obtained in Comparative Example 1 was subjected to the aforedescribed smoothness test in the same manner as was performed for Example 1. The results are displayed in Table 2.

TABLE 2

| | No. of location where weight was placed | | | | | | | | | | |
|---|---|---|---|---|---|---|---|---|---|---|---|
| | 1 | 2 | 3 | 4 | 5 | 6 | 7 | 8 | 9 | 10 | Avg. |
| Angle at which weight started to slide | 56° | 47° | 53° | 47° | 56° | 50° | 60° | 47° | 56° | 47° | 52° |

As is evident from Table 2, the ultrathin flexible sheet 2 of Comparative Example 1 did not pass the smoothness test.

COMPARATIVE EXAMPLE 2

A stretched porous PTFE film was cut to dimensions of 300 mm by 300 mm, and five samples were laid atop one another while spread out on a flat plate. The films were extremely thin and poorly resistant to plastic deformation, for which reason the formation of fine wrinkles on the film surface could not be avoided during lamination. The laminated article 50 was coated and impregnated with a suitable amount of the same silicone elastomer used in Example 1 without bonding being performed or any compressive load or tensioning being applied to the laminated article 50. The excess elastomer present on the surface of the laminated article was scraped off thrice with a spatula made of silicone rubber. The elastomer was cured in an oven, after which the stretched porous PTE films 10 were peeled off. The uppermost and lowermost sheets 1a, 1b were discarded, and the peripheries (all four edges) of sheets 1 obtained from the middle portion were trimmed to yield three ultrathin flexible sheets 1 that had a thickness of 40 μm and measured 250 mm by 250 mm. Minute air pockets (voids) had formed between the films during lamination, for which reason the presence of excess residual elastomer could be confirmed in the corresponding locations even by macroscopic observation.

Figure 11:
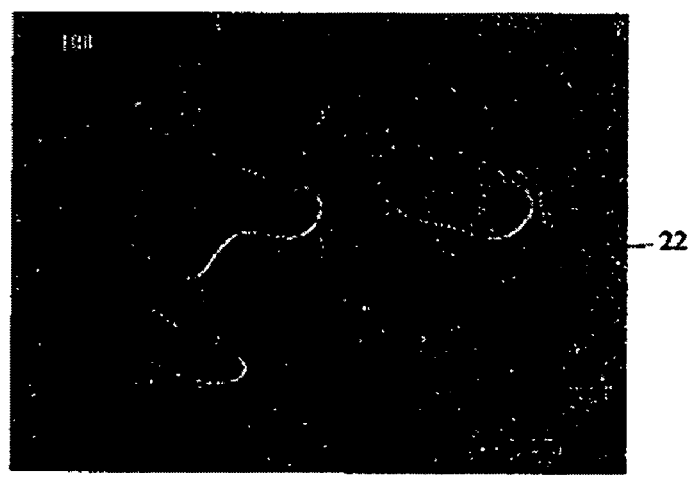
FIG. 11 is a photomicrograph (1st of 2) of a top view of the ultrathin flexible sheet of Comparative Example 2.
Figure 12:
FIG. 12 is a photomicrograph (2nd of 2) of a top view of the ultrathin flexible sheet of Comparative Example 2.

Photomicrographs showing top views of an ultrathin flexible sheet 1 obtained in Comparative Example 2 (FIGS. 11 and 12)) were captured (analytical instrument: "VH-7000" (trade name); manufactured by Keyence Corporation; magnification: 100×). As is evident from FIG. 11, excess elastomer 22 had remained; and as is evident from FIG. 12, wrinkles 23 had also formed.

While particular embodiments of the present invention have been illustrated and described herein, the present invention should not be limited to such illustrations and descriptions. It should be apparent that changes and modifications may be incorporated and embodied as part of the present invention within the scope of the following claims.

I claim:

1. An ultrathin flexible sheet, characterized in being a porous film-elastomer composite whose pores are filled with an elastomer, and in that the said ultrathin flexible sheet comprises an elastomer layer covering a portion of both sides of said porous film, and wherein at least a portion of the surface of the porous film is exposed and wherein the thickness of each of said elastomer layers is one micron or less.

2. The ultrathin flexible sheet of any of claim 1 that is 50 μm or less in thickness.

3. The ultrathin flexible sheet of claim 1, wherein the porous film is a stretched porous polytetrafluoroethylene film.

4. The ultrathin flexible sheet of claim 1, wherein the elastomer is a silicone-based elastomer and/or a fluorine-based elastomer.

5. The ultrathin flexible sheet of claim 4, wherein the silicone-based elastomer is a methyl silicone-based elastomer and/or a phenyl silicone-based elastomer.

6. The ultrathin flexible sheet of claim 4, wherein the fluorine-based elastomer is selected from a fluorosilicone elastomer, a fluoroelastomer, and a perfluoroelastomer.

7. A laminated article for manufacturing the ultrathin flexible sheet of claims 1, comprising three or more layers of porous film joined together in continuous contact wherein the pores of the porous film layers are filled with an elastomer.

* * * * *